Patented May 1, 1945

2,374,791

UNITED STATES PATENT OFFICE 2,374,791

ORGANIC AMINE DERIVATIVES AND METHOD OF OBTAINING SAME

Edward W. Tillitson, Grosse Pointe Farms, Mich., assignor to Parke, Davis & Company, Detroit, Mich., a corporation of Michigan No Drawing. Application June 22, 1942, Serial No. 448,001

6 Claims. (Cl. 260—211)

The invention relates to new water soluble derivatives of sulfanilamide and $N^1$-substituted derivatives of sulfanilamide.

This application is a continuation-in-part of my application, Serial No. 223,763, filed August 8, 1938, now Patent No. 2,287,071, issued June 23, 1942.

I have found that sulfanilamide and certain of its $N^1$-substituted derivatives are capable of reacting with a water soluble bisulfite salt and certain alpha hydroxy aldehydes to give new and useful products. The new products have, in greater or less degree, the valuable property of being more soluble in aqueous solutions than the original amine free base used in the reaction. Furthermore, the new solubilized sulfanilamide derivatives are non-toxic and not only retain the chemotherapeutic effectiveness of the original sulfanilamide compound but even surpass it in some instances.

The type formula which may be used for representing the products of the invention is,

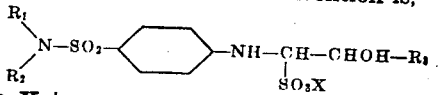

where X is a member of the group hydrogen, sodium, ammonium, ammonium substituted by at least one alkyl, hydroxyalkyl, amino alkyl or alkylamino alkyl radical, $R_1$ is a member of the group hydrogen, alkyl, alkyl substituted by at least one of —$CONH_2$ and —COOX, aliphatic acyl, aliphatic acyl substituted by at least one of —$CONH_2$ and —COOX, phenyl, aminophenyl, sulfonamido phenyl, sulfon-(alkyl)-amido phenyl, a heterocyclic radical having a ring of 5 to 6 atoms of the class carbon, nitrogen and sulfur, at least one of said atoms being a carbon atom and at least one being nitrogen, the heterocyclic radical being attached to the sulfonamide nitrogen atom of the above formula through said carbon atom, and a benzoheterocyclic radical,

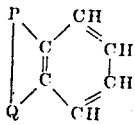

where —P—Q— is a chain of 3 to 4 atoms of the class carbon, nitrogen and sulfur, at least one of said atoms being carbon and at least one being nitrogen, the benzoheterocyclic radical being attached to the sulfonamide nitrogen atom of the general formula through said carbon atom of —P—Q—, $R_2$ is a member of the group X, alkyl, alkyl substituted by at least one of —$CONH_2$ and —COOX, and $R_3$ is a member of the group hydrogen, alkyl, hydroxy alkyl and hydroxy alkyl substituted by at least one of hydroxyl, amino, —$CONH_2$, —COOX and a lactone grouping corresponding to —COOH and contained within or derived directly from the radical —CHOH—$R_3$ itself.

In the above description of the formula for the compounds of the invention, wherever the word "alkyl" is used it includes only those alkyl derivatives wherein the longest unbroken chain of carbon atoms present does not exceed six.

Apparently the alpha hydroxy aldehyde bisulfite sulfanilamide derivatives of the invention are comparatively easily broken up in the body following administration to give products equivalent to or even superior in therapeutic action to the original sulfanilamide or its $N^1$-substituted derivative and can therefore be used instead of sulfanilamide and its $N^1$-derivatives. In many instances the aldehyde bisulfite derivatives also can be used where the unreacted sulfanilamide compound is unsuitable. The new compounds are especially valuable because of their increased solubility.

Among the new compounds I have found a preferred group of the formula,

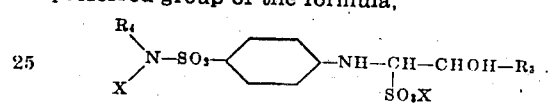

where $R_3$ and X have the same significance as in the general formula but where $R_4$ is limited to the heterocyclic and benzoheterocyclic radicals described for $R_1$ of the general formula.

These latter compounds are preferred because many of them are very effective antiseptics and germicides. They can be prepared for therapeutic administration in much higher concentrations than is possible with the corresponding amine free base. For example, sulfapyridine of the formula, $C_5H_5N$—NH—$SO_2$—$C_6H_4$—$NH_2$, when condensed with sodium bisulfite and an aldose or sugar, such as dextrose, gives a product of many times greater solubility in aqueous solution, of the order of about 40 or more times, than that of sulfapyridine itself.

The preferred alpha hydroxy aldehydes for use in the invention are the naturally occurring aldo-sugars. These may be any of the soluble aldo-sugars, such as mono-saccharoses or di-saccharoses, and may be in the form containing free aldehyde groups or the equivalent pyranose or furanose structures.

The compounds of the preferred aldo-sugar bisulfite type are particularly useful because the sugar and the bisulfite parts of the molecule are nontoxic and readily eliminated by the body and this enhances their therapeutic value.

Examples of the aldo-sugars are the aldo pentoses such as arabinose, ribose, xylose and rhamnose, the aldo hexoses such as glucose, galactose and mannose, the aldoheptoses and aldo octoses, aldo disaccharides such as lactose and maltose, aldo trisaccharides and the like.

As already indicated above under the general formula for the new products, the invention in its broader aspects includes reaction of the sulfanilamide compound with bisulfite and alpha hydroxy aldehydes other than the naturally occurring aldo sugars. For example alpha hydroxy aldehydes may be used which will give final products wherein R₃ of the general formula is any of the following.

—H
—CH₂OH
—CHOH—CH₃
—CHOH—CH₂OH
—CHOH—CHOH—COOH (or its lactone)
—CHOH—CHOH—CONH₂
—CHOH—CHOH—COONa
—CHOH—CHOH—CHOH—CH₂NH₂
—CHOH—CH₂—CH₂—CH₃
—CHOH—CH₂—CH₂—COOH
—CHOH—CH₂—CH₂—COONa
—CH₂—CHOH—CH₃
—CH₂—CHOH—COOH
—CH₂—CHOH—COONa
—CHOH—CHOH—CHOH—COOH (or its lactone)
—CHOH—CHOH—CHOH—COONa
—CHOH—CHOH—CHOH—CONH₂
—CHOH—CHOH—CHOH—CH₃
—CHOH—CHOH—CHOH—CH₂OH
—CHOH—CHOH—CHOH—CONHCH₂CH₂OH
—CHOH—CHOH—CHOH—COONH₄
—CHOH—CHOH—CHOH—COONH₂(CH₂CH₂OH)₂
—CHOH—CHOH—CHOH—COONH₂(CH₂CHOH—CH₃)₂

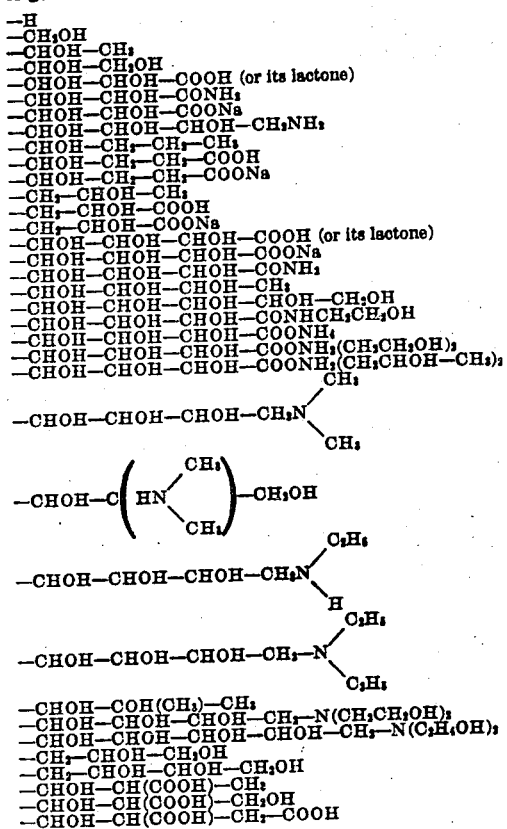

The sulfur in the condensation products is probably present as in a sulfonic acid group,

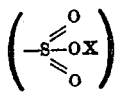

the sulfur having a valence of six instead of four. Hence, it seems proper to call the new compounds alpha hydroxy aldehyde sulfonate derivatives.

In obtaining the compounds of the invention, the amine free base, the hydroxy aldehyde, and the bisulfite salt or sulfur dioxide may be brought together in any order. Preferably, however, the bisulfite and the hydroxy aldehyde are first reacted and this reaction product is then further reacted or condensed with the amine free base or sulfanilamide compound.

In reacting the sulfanilamide or its N¹-derivative with the hydroxy aldehyde and the bisulfite salt it may be desirable in some cases to use an excess of the aldehyde and bisulfite since I have found that the presence of an excess of the latter two substances frequently results in concentrated aqueous solutions of the condensate being more stable than when equimolecular proportions are reacted. For instance, a mole of sulfanilamide can be reacted with about 1.2 moles of sodium bisulfite and about 1.4 moles of dextrose or even higher proportions to give a product which is more stable, especially in aqueous solutions of high concentration, than the product obtained by using exact equimolecular quantities of reagents.

I do not wish to limit the invention by any theory as to the reactions which occur during formation of the new products. However, it appears that the condensation takes place somewhat as follows:

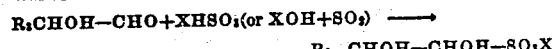
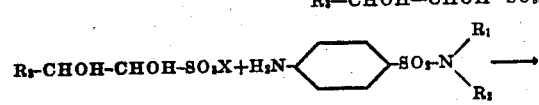
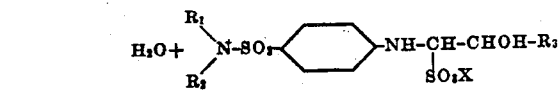

On the basis of these reactions, there would be a possibility of decomposition of the final condensate in aqueous solutions and the presence of an excess of bisulfite salt or hydroxy aldehyde, or both, would in some cases tend to prevent the amine aldehyde bisulfite condensate from decomposing with precipitation of the less soluble amine free base.

The condensation can be carried out not only in aqueous solution but also, when the amine is sufficiently thermostable, by fusing the reactants together in the dry state. The fact that the condensates generally have far greater solubility than the amine free bases from which they are derived, shows that definite compounds are formed, probably in accordance with the equations given above.

When obtaining the products of the invention by fusion of the reagents in the dry state, it is preferred that the hydroxy aldehyde be brought to the liquid state, by heating if necessary, and the alkali bisulfite first added and then the amine free base. Vigorous stirring may be required and in the case of some aldehydes, such as sugars, careful temperature control may also be advisable in order to obtain a pure white product.

Obvious variations of the methods used in obtaining my products will occur to those skilled in this art. For example, a salt of the sulfanilamide compound, such as the amine hydrochloride salt or the N¹-sodium salt can be reacted in the presence of an alkaline sulfite or sulfur dioxide respectively to generate a bisulfite. Alternatively, one can use an aldehyde or else a sulfanilamide substituted by —COOH along with an alkaline sulfite in proportions to also give a bisulfite. Variations of this type can be illustrated, for example, by the following combinations of reactants.

(1)
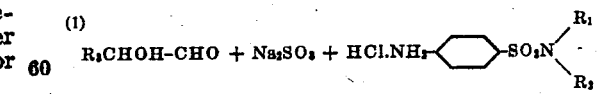

(2)
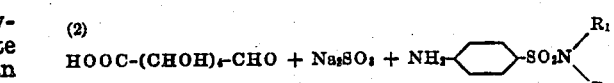

(3)
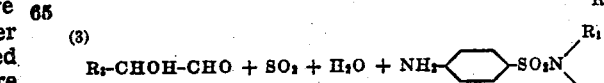

(4)
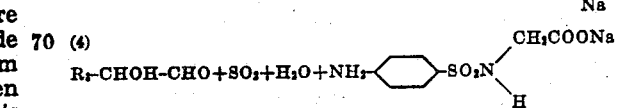

Since it has become common usage in the literature to refer to various derivatives of sulfanilylamide by somewhat abbreviated names, the same practice will be followed in describing sulfanilylamide derivatives employed in the examples. The following list will indicate the accepted abbreviations:

| Chemical name | Accepted abbreviation |
| --- | --- |
| Sulfanilylamide | Sulfanilamide. |
| 2-sulfanilylamido-pyridine | Sulfapyridine. |
| 2-sulfanilylamido-thiazole | Sulfathiazole. |
| 2-sulfanilylamido-4-methylthiazole | Sulfamethylthiazole. |
| 2-sulfanilylamido-pyrimidine | Sulfadiazine. |
| Sulfanilyl-guanidine | Sulfaguanidine. |

The following examples will serve to illustrate the invention:

Example 1—Sulfanilamide dextrose sodium sulfonate (reaction in solution)

375 grams of dextrose and 145 grams of sodium bisulfite are heated to boiling in 500 cc. of water. 198 grams of sulfanilamide are added and the boiling continued in the open air until the volume is reduced to 600 cc. This gives a clear, viscous and almost colorless solution containing the equivalent of 0.33 gram of sulfanilamide per cc. This solution may be diluted to any desired concentration without formation of a precipitate. It can be evaporated down to dryness to give a dry solid which is also readily soluble in water. Approximately 30 or 40 times as much of the dry product can be brought into solution as is possible with sulfanilamide itself. Furthermore, the sulfanilamide dextrose sodium sulfonate product of this example has the same order of antiseptic power as an equivalent amount of sulfanilamide itself.

Example 2—Sulfanilamide dextrose sodium sulfonate (reaction by fusion)

472 grams of dextrose are fused at a temperature not substantially in excess of 155° C. and 181 grams of sodium bisulfite rapidly stirred into the fused dextrose. By stirring the reactants, a uniform pasty mass free from lumps is obtained. 250 grams of sulfanilamide are rapidly stirred into this pasty mass, after which the hot material is spread out in a thin layer and cooled in vacuo. Moisture resulting from the condensation reaction is removed during the cooling in vacuo. The dry solid product is a porous mass and may be pulverized if desired. The reaction product is the same as that obtained in Example 1 and has the same properties.

Example 3—Sulfanilamide d-galactose sodium sulfonate 24.3 grams of d-galactose and 12.5 grams of sodium bisulfite are dissolved in about 50 cc. of hot water. About 17.2 grams of sulfanilamide are added and the heating continued for about 30 minutes. The reaction product may be diluted further with water or may be brought to dryness as described for the product of Example 1 above.

Example 4—Sulfanilamide maltose sodium sulfonate 27 grams of maltose and 6.2 grams of sodium bisulfite are heated in about 50 cc. of water. 8.6 grams of sulfanilamide are then added and the heating continued until solution is complete. The solution of the sulfanilamide maltose sodium sulfonate thus obtained is rather concentrated and it may be either brought to dryness to give the solid product or may be diluted further with water or other solvent.

Example 5—Sulfanilamide lactose sodium sulfonate 36 grams of lactose, 10.5 grams of sodium bisulfite and 17 grams of sulfanilamide are added to about 300 cc. of water and heated until the reaction is complete and all of the product is in solution. The final solution of the condensate resembles that of the preceding examples and upon evaporating the solvent the dry solid product is obtained. It has about the same appearance as the dry product of the preceding examples.

Example 6—Sulfanilamide glyceraldehyde sodium sulfonate 92 grams of glyceraldehyde, 104 grams of sodium bisulfite and 170 grams of sulfanilamide are heated in 250 cc. of water until solution is complete. The resulting solution of the reaction product can be obtained in dry form by evaporation of the solvent.

Example 7—p'-Aminobenzene sulfonyl p-amino benzene sulfonamide dextrose sodium sulfonate Three grams of disulfanilamide (p'-aminobenzenesulfonyl p-amino benzene sulfonamide), 2 grams of dextrose and 1.1 grams of sodium bisulfite are boiled in 20 cc. of water until solution is complete. The water is then evaporated off, thereby giving the solid condensation product which readily dissolves in concentrations far greater than is possible with the amine free base used as a starting material.

Example 8—Sulfapyridine-N⁴-dextrose sodium sulfonate (reaction in solution)

50 g. of sulfapyridine, 100 g. of dextrose, and 20 g. of sodium bisulfite are mixed with 150 cc. of water and warmed and shaken to dissolve the dextrose and sodium bisulfite. The mixture is then heated and about 100 cc. of absolute alcohol added following which the liquid is boiled with or without reflux for about an hour or until the solution becomes clear. Water and alcohol are added from time to time to make up for solvent lost by evaporation if a condenser is not used. The clear solution is boiled until the temperature rises to 100–103° to remove all alcohol. The volume is then adjusted to 200 cc. with water to give a stable solution containing the equivalent 250 mg./cc. of sulfapyridine. The solution has a pH of approximately 6 and is suitable for injection as such or it may be diluted.

If a solid product is desired the above solution may be evaporated to dryness under reduced pressure and the solid pulverized. The powder readily redissolves on mixing and/or warming with a little water.

Example 9—Sulfapyridine-N⁴-dextrose sodium sulfonate (reaction by fusion)

100 g. dextrose is fused at 155–160° on an oil bath and 45 g. of finely powdered sulfapyridine is quickly added and stirred in followed by 18 g. of finely powdered sodium bisulfite which is likewise stirred in. The material is transferred to a desiccator which is then evacuated as the batch cools. The cooled solid is powdered. It may be discolored somewhat.

Example 10—Sulfapyridine-N⁴-galactose sodium sulfonate 5 g. of sulfapyridine, 10 g. of d-galactose, and 2 g. of sodium bisulfite are boiled with 15 cc. of water and 10 cc. of alcohol. The boiling is continued until the solution becomes clear. Water and alcohol are added from time to time to replace part of that which is evaporated. The clear solution is heated to 100° to remove all alcohol. The volume is made up to 20 cc. giving a solution containing the equivalent of 250 mg./cc. of sulfapyridine.

*Example 11—Sulfapyridine-$N^4$-mannose sodium sulfonate*

2.5 g. of sulfapyridine, 5 g. of mannose, 1 g. sodium bisulfite, 8 cc. of water, and 5 cc. of alcohol are heated together as in Example 3.

*Example 12—Sulfapyridine-$N^4$-arabinose sodium sulfonate*

5 g. of sulfapyridine, 9 g. of arabinose, 2 g. sodium bisulfite, 15 cc. of water, and 10 cc. of alcohol are boiled on an electric hot plate until the solution becomes clear. Water and alcohol in small quantities are added from time to time to replace that lost by evaporation. The clear solution is heated to approximately 100° to remove the alcohol and is then made up to a volume of 25 cc. with water and filtered giving a concentration equivalent to 200 mg./cc. of sulfapyridine. The filtered solution may be placed in ampoules and then sterilized by heating at 80° for ½ hour on three successive days.

*Example 13—Sulfapyridine-$N^4$-lactose or maltose sodium sulfonate*

5 g. of sulfapyridine, 20 g. of lactose or maltose, 2 g. of sodium bisulfite, 15 cc. of water, and 10 cc. of alcohol were boiled until the solution cleared. Water and alcohol were added from time to time to make up for part of that lost by evaporation. The clear solution was heated to 100–105° C. to remove the alcohol. The resulting solution was made up to 30 cc. and filtered. The resulting solution contains the equivalent of approximately 165 mg./cc. of sulfapyridine.

*Example 14—Sulfamethylthiazole dextrose sodium sulfonate*

1.0 g. sulfamethylthiazole, 2 g. dextrose, 0.4 g. sodium bisulfite are heated in a few cc. of water and alcohol until the solution becomes clear. The alcohol is boiled off giving a clear aqueous solution. Part of the solution is evaporated to dryness giving a friable porous solid which is readily powdered. The dry powder readily redissolves in water to give a clear solution.

*Example 15—Sulfathiazole dextrose sodium sulfonate*

5 g. sulfathiazole, 8 g. dextrose, 2.1 g. sodium bisulfite, 15 cc. water, and 15 cc. alcohol are refluxed until the solution clears. The alcohol is boiled off and the resulting clear solution after filtering to remove specks is evaporated to dryness under reduced pressure with or without the aid of a desiccant giving a brittle porous solid mass. After grinding the powder readily redissolves in water giving a clear stable solution which is useful therapeutically.

*Example 16—Sulfathiazole dextrose sodium sulfonate*

255 g. sulfathiazole, 495 g. dextrose, 106 g. sodium bisulfite, 400 cc. water, and 300 cc. alcohol are boiled for about 1 hour or until solution is complete. The temperature is then slowly raised to 103° to eliminate the alcohol. The solution is filtered hot to remove specks. The volume of the filtrate may be made up to one liter giving a stable injectable aqueous solution containing 250 mg./cc. of sulfathiazole. The solution is suitably stored in closed containers such as ampoules. It is useful therapeutically.

*Example 17—Sulfathiazole galactose sodium sulfonate*

Using the same quantities of materials and procedure as given in Example 16, but substituting galactose for glucose, there is obtained a stable solution of sulfathiazole galactose sodium sulfonate. The solution may be evaporated to dryness to give a solid product which will readily redissolve and is therapeutically useful.

*Example 18—Sulfathiazole maltose monoisopropanol ammonium sulfonate*

2.5 g. sulfathiazole, 7.2 g. maltose, and 2 g. monoisopropanol ammonium bisulfite are mixed in 20 cc. water and heated. A little alcohol may be added to increase the solubility of the sulfathiazole and thus hasten the reaction. After the solution is clear the alcohol is boiled off giving a clear stable aqueous solution of sulfathiazole maltose monoisopropanol ammonium sulfonate. The solution is filtered to remove specks. It may be used therapeutically as such. The solution may be evaporated under reduced pressure to give a solid which is also useful therapeutically. The solid readily redissolves to produce clear stable solutions.

*Example 19—Sulfathiazole dextrose monoisopropanol ammonium sulfonate*

If the maltose of Example 18 is replaced with approximately 3.56 g. dextrose, a product of similar character is obtained.

*Example 20—Sulfathiazole xylose monoethanol ammonium sulfonate*

2.5 g. 2-sulfanilylamido-thiazole, 3 g. xylose, and 1.5 g. monoethanol ammonium bisulfite are mixed with 10 cc. water and brought to a boil whereupon a clear stable solution results containing sulfathiazole xylose monoethanol ammonium sulfonate. The solution and the solid obtained by evaporation are therapeutically useful.

*Example 21—Sulfapyridine dextrose monoethanol ammonium sulfonate*

2.5 g. sulfapyridine, 5.2 g. dextrose, and 1.8 g. monoethanol ammonium bisulfite are mixed with 30 cc. water and 20 cc. alcohol and boiled. The solution becomes clear in a few minutes. The alcohol is removed by boiling. The cooled solution has a volume of about 18 cc. It is clear and stable. A stable solid may be obtained from the solution by evaporation. Both the solid and solution are useful therapeutically.

*Example 22—Sulfanilamide dextrose monoethanol ammonium sulfonate*

1.72 g. sulfanilamide, 3.2 g. dextrose, and 1.5 g. monoethanol ammonium bisulfite are mixed with 10 cc. water and warmed. The solution soon becomes clear giving a solution of sulfanilamide dextrose monoethanol ammonium sulfonate.

*Example 23—Sulfanilamide xylose ammonium sulfonate*

Substitution of 2.25 g. xylose for the dextrose and an aqueous solution containing 1 g. ammonium bisulfite for the monoethanol ammonium bisulfite of Example 22 gives a product having similar characteristics to the product of the above example. The solution may be reduced to a solid by evaporation of the solvent from the liquid, or sublimation of the solvent from the frozen state. Both the solution and the solid are therapeutically useful.

*Example 24—Sulfanilamide dextrose triisopropanol ammonium sulfonate*

1.72 g. sulfanilamide, 3 g. dextrose, and 3.4 g. triisopropanol ammonium bisulfite are mixed with 10 cc. water and heated. The sulfanilamide soon reacts and is carried into solution. The solubility of the sulfanilamide compound is so great that the solution may be concentrated to a thick syrup without evidence of precipitation.

*Example 25—Sulfadiazine dextrose triisopropanol ammonium sulfonate*

2.5 g. sulfadiazine, 5.2 g. dextrose and 4.1 g. triisopropanol ammonium bisulfite are mixed with 20 cc. water and 30 cc. alcohol. The mixture is boiled giving a clear solution of sulfadiazine dextrose triisopropanol ammonium sulfonate which may be obtained in solid form by removing the remaining solvents.

*Example 26—Sulfadiazine dextrose sodium sulfonate*

12.5 g. sulfadiazine, 40 g. dextrose, and 7 g. sodium bisulfite are heated in about 100 cc. water and 100 cc. alcohol and boiled until the solution clears. Water and alcohol may be added from time to time to make up for that lost due to evaporation. The clear solution is heated to 100–105° to remove all alcohol. The volume may be adjusted to 100–150 cc. depending on the concentration desired. The product is a therapeutically useful combination. It may be isolated in solid form by removal of the remaining solvent.

*Example 27—Sulfadiazine maltose sodium sulfonate*

16 g. sulfadiazine, 72 g. maltose, and 12 g. sodium bisulfite are boiled in 225 cc. water and 100 cc. alcohol. Water and alcohol are added from time to time to make up for that lost by evaporation. After the solution becomes clear the alcohol is boiled out by raising the temperature to 100–106.° The resulting solution may be used therapeutically. The product of this example has the formula,

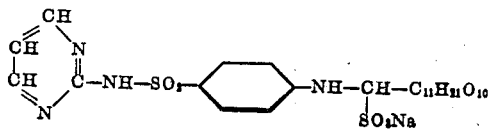

*Example 28—Sulfaguanidine dextrose sodium sulfonate*

21.4 g. sulfaguanidine, 45 g. dextrose, and 10.6 g. sodium bisulfite are brought to a boil in 100 cc. water. The sulfaguanidine soon reacts with the dextrose sodium sulfonate giving a clear solution which may be used therapeutically.

*Example 29—Sulfadiazine dextrose ammonium sulfonate*

2.5 g. sulfadiazine, 8 g. dextrose, 2 g. ammonium bisulfite (added as a 50% solution) are heated with 15–20 cc. water and 10–20 cc. alcohol until the sulfadiazine reacts and goes into solution. The alcohol is boiled off giving a stable aqueous solution. It is useful therapeutically. A solid which readily redissolves may be obtained by evaporating to dryness under reduced pressure. Both the solid and liquid are therapeutically useful.

*Example 30—Sulfaguanidine lactose ammonium sulfonate*

2.14 g. sulfguanidine, 12 g. lactose, 1.5 g. ammonium bisulfite (as 50% solution) are heated in 20 cc. water. The mixture readily reacts to form a clear solution which may be used therapeutically.

*Example 31—Sulfanilamide glyceraldehyde sodium sulfonate*

1.72 g. sulfanilamide, 1.5 g. glyceraldehyde, and 1.04 g. sodium bisulfite are heated in 10 cc. water until the solution clears. The solution of sulfanilamide glyceraldehyde sodium sulfonate thus formed is useful therapeutically.

*Example 32—Sulfathiazole sodium glucuronate sodium sulfonate*

2.5 g. sulfathiazole, 2.5 g. glucuronic acid, and 1.3 g. sodium sulfite are heated in 10–15 cc. water and 10–15 cc. alcohol until the sulfathiazole reacts and goes into solution. The alcohol is removed by boiling. The resulting aqueous solution of sulfathiazole sodium glucuronate sodium sulfonate is stable and therapeutically useful.

*Example 33—Sulfathiazole sodium galacturonate sodium sulfonate*

Substitution of 2.5 g. galacturonic acid for the gulcuronic acid of Example 32 produces a product of the same character.

*Example 34—$N^1$-di-($\beta$-hydroxy ethyl) sulfanilamide dextrose sodium sulfonate*

2.6 g. $N^1$-di-($\beta$-hydroxy ethyl) sulfanilamide, 3.1 g. dextrose, 1.2 g. sodium bisulfite are heated in 15 cc. water and 3 cc. propylene glycol until the $N^1$-sulfanilamide derivative reacts and dissolves giving an aqueous propylene glycol solution of $N^1$-di-($\beta$-hydroxy ethyl) sulfanilamide.

*Example 35—$N^1$-di-($\beta$-hydroxy ethyl) sulfanilamide ribose trimethylol methyl ammonium sulfonate*

2.6 g. $N^1$-di-($\beta$-hydroxy ethyl) sulfanilamide, 2.2 g. ribose, and 2.2 g. trimethylol methyl ammonium bisulfite are heated in 15 cc. water and 5 cc. alcohol. The sulfanilamide derivative soon reacts and goes into solution whereupon the alcohol is boiled out giving a clear aqueous solution. The product may be used as such or converted to the solid form by removing the remaining solvent under reduced pressure.

*Example 36—$N^1$-methyl-$N^4$-sulfanilyl sulfanilamide maltose amino-ethylene ammonium sulfonate*

3.4 g. $N^1$-methyl-$N^4$-sulfanilyl sulfanilamide, 7.5 g. maltose, and 2 g. ethylene diamine mono-bisulfite are heated in 15–20 cc. water and 5 cc. glycerol until the sulfanilamide derivative reacts to give a clear solution. This solution is useful therapeutically.

*Example 37—$N^1$-dimethyl-$N^4$-sulfanilyl sulfanilamide lactose piperazine sulfonate*

3.5 g. $N^1$-dimethyl-$N^4$-sulfanilyl sulfanilamide, 7.2 g. lactose, and 2 g. piperazine mono-bisulfite are heated with 15–20 cc. water and 5 cc. propylene glycol. The sulfanilamide derivative soon reacts to give a clear solution. The solution may be used therapeutically.

*Example 38—N¹-acetyl sulfanilamide galactose sodium sulfonate*

2.1 g. N¹-acetyl sulfanilamide, 3 g. galactose, and 1.1 g. sodium bisulfite are reacted as in Example 21.

*Example 39—N¹-sodium carboxy methylene sulfanilamide sodium galacturonate sodium sulfonate*

2.5 g. N¹-sodium carboxymethylene sulfanilamide, 2.0 g. galacturonic acid, 1.3 g. sodium sulfite, are mixed in 15–20 cc. water and warmed. Complete solution soon results due to the rapidity of the reaction. The solid product which readily redissolves to give clear solutions may be isolated by dehydrating the solution. Both the solution and the solid may be used therapeutically.

*Example 40—2-sulfanilylamido benzothiazole ammonium glucuronate ammonium sulfonate*

3 g. sulfanilylamido benzothiazole, and 2.5 g. glucuronic acid are warmed in sufficient 85% alcohol to form a solution. 0.72 g. sulfur dioxide is added. 0.41 g. ammonia dissolved in about 15 cc. water is added. The alcohol is boiled off giving a solution which may be used therapeutically.

*Example 41—2-sulfanilylamido thiazolone galacturonamide ethyl ammonium sulfonate*

2.7 g. 2-sulfanilylamido thiazolone, 2.6 g. galacturonamide, 1.31 g. ethyl ammonium bisulfite are warmed in 15 cc. alcohol and 15 cc. water until the 2-sulfanilylamido thiazolone dissolves. The alcohol is removed by evaporation giving a clear solution which may be used therapeutically.

*Example 42—2-sulfanilylamido indazole rhamnose δ-diethyl amino-(α-methyl) butyl ammonium sulfonate*

2.9 g. 2-sulfanilylamido indazole, 5 g. rhamnose, and 2.8 g. of the ammonium bisulfite salt derived from δ-diethyl amino (α-methyl) butyl amine and one equivalent of sulfur dioxide are heated in 20 cc. water, 5 cc. glycerine, and 20 cc. alcohol until the sulfanilamide derivative goes into solution. The alcohol is evaporated off. The resulting solution may be filtered to remove specks.

What I claim as my invention is:

1. Compounds of the formula

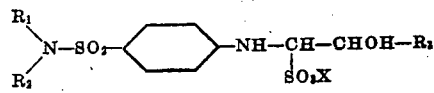

where X is a member of the group consisting of hydrogen, sodium, ammonium, ammonium substituted by at least one alkyl, hydroxyalkyl, amino alkyl and alkylamino alkyl radical, R₁ is a member of the group consisting of hydrogen, alkyl, alkyl substituted by at least one of —CONH₂ and —COOX, aliphatic acyl, aliphatic acyl substituted by at least one of —CONH₂ and —COOX, phenyl, aminophenyl, sulfonamido phenyl, sulfon-(alkyl)-amido phenyl, a heterocyclic radical having a ring of 5 to 6 atoms of the class consisting of carbon, nitrogen and sulfur, at least one of said atoms being a carbon atom and at least one being nitrogen, the heterocyclic radical being attached to the sulfonamide nitrogen atom of the above formula through said carbon atom, and a benzoheterocyclic radical,

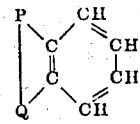

where —P—Q— is a chain of 3 to 4 atoms of the class consisting of carbon, nitrogen and sulfur, at least one of said atoms being carbon and at least one being nitrogen, the benzoheterocyclic radical being attached to the sulfonamide nitrogen atom of the general formula through said carbon atom of —P—Q—, R₂ is a member of the group consisting of X, alkyl, alkyl substituted by at least one of —CONH₂ and —COOX, and R₃ is a member of the group consisting of hydrogen, alkyl, hydroxy alkyl and hydroxy alkyl substituted by at least one of hydroxyl, amino, —CONH₂, —COOX and a lactone grouping corresponding to —COOH and contained within or derived directly from the radical —CHOH—R₃ itself, the term alkyl including only those alkyl derivatives wherein the longest unbroken chain of carbon atoms present does not exceed 6.

2. A compound of the formula

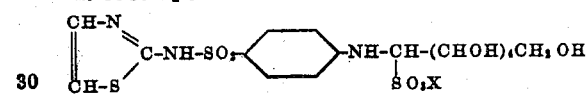

where X is a member of the group consisting of hydrogen, sodium, ammonium, and ammonium substituted by at least one of alkyl, hydroxy alkyl, amino alkyl and alkyl amino alkyl, the term alkyl including only those alkyl derivatives wherein the longest unbroken chain of carbon atoms present does not exceed 6.

3. A dextrose derivative of the formula,

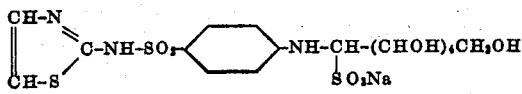

4. A dextrose derivative of the formula,

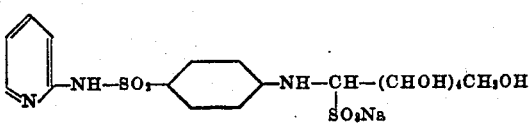

5. A maltose derivative of the formula

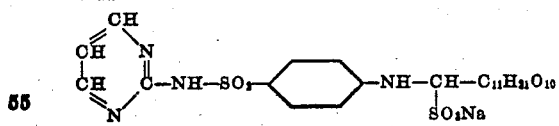

6. Method for obtaining a derivative of para amino benzene sulfonamide which comprises bringing together at a reacting temperature not substantially above about 155° C. abisulfite of formula XHSO₃, and alpha hydroxy aldehyde of formula

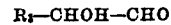

and a para amino benzene sulfonamide of formula,

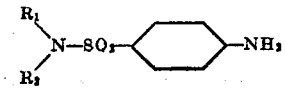

where X is a member of the group consisting of hydrogen, sodium, ammoium, ammonium substituted by at least one alkyl, hydroxy alkyl, amino alkyl and alkyl amino alkyl radical, R₁ is a member of the group consisting of hydrogen, alkyl, alkyl substituted by at least one of —CONH₂ and —COOX, aliphatic acyl, aliphatic acyl substituted by at least one of —CONH$_2$ and —COOX, phenyl, aminophenyl, sulfonamido phenyl, sulfon-(alkyl)-amino phenyl, a heterocyclic radical having a ring of 5 to 6 atoms of the class consisting of carbon, nitrogen and sulfur, at least one of said atoms being a carbon atom and at least one being nitrogen, the heterocyclic radical being attached to the sulfonamide nitrogen atom of the above formula through said carbon atom, and a benzoheterocyclic radical,

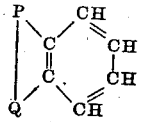

where —P—Q— is a chain of 3 to 4 atoms of the class consisting of carbon, nitrogen and sulfur, at least one of said atoms being carbon and at least one being nitrogen, the benzoheterocyclic radical being attached to the sulfonamide nitrogen atom of the general formula through said carbon atom of —P—Q—, $R_2$ is a member of the group consisting of X, alkyl, alkyl substituted by at least one of —CONH$_2$ and —COOX, and $R_3$ is a member of the group consisting of hydrogen, alkyl, hydroxy alkyl and hydroxy alkyl substituted by at least one of hydroxyl, amino, —COHN$_2$, —COOX and a lactone grouping corresponding to —COOH and contained within or derived directly from the radical —CHOH—$R_3$ itself, the term alkyl including only those alkyl derivatives wherein the longest unbroken chain of carbon atoms present does not exceed 6.

EDWARD W. TILLITSON.